US012417275B2

(12) United States Patent
Maiman et al.

(10) Patent No.: US 12,417,275 B2
(45) Date of Patent: *Sep. 16, 2025

(54) PREVENTING UNAUTHORIZED ACCESS TO PERSONAL DATA DURING AUTHENTICATION PROCESSES

(71) Applicant: Capital One Services, LLC, McLean, VA (US)

(72) Inventors: Tyler Maiman, Melville, NY (US); Viraj Chaudhary, Katy, TX (US); Samuel Rapowitz, Roswell, GA (US); Daniel Miller, Brooklyn, NY (US); David Septimus, New York, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/605,125

(22) Filed: Mar. 14, 2024

(65) Prior Publication Data
US 2024/0220600 A1 Jul. 4, 2024

Related U.S. Application Data

(63) Continuation of application No. 17/362,045, filed on Jun. 29, 2021, now Pat. No. 11,960,592.

(51) Int. Cl.
*G06F 21/45* (2013.01)
*G06F 21/31* (2013.01)
*H04L 9/40* (2022.01)

(52) U.S. Cl.
CPC ............ *G06F 21/45* (2013.01); *G06F 21/31* (2013.01); *H04L 63/0807* (2013.01);
(Continued)

(58) Field of Classification Search
CPC ..... G06F 21/45; G06F 21/31; H04L 63/0807; H04L 63/083; H04L 63/0838; H04L 63/0892; H04L 63/102
See application file for complete search history.

(56) References Cited

U.S. PATENT DOCUMENTS 8,151,343 B1 4/2012 Wang et al.
8,875,255 B1 10/2014 Dotan et al.
(Continued)

OTHER PUBLICATIONS

May 22, 2017—Wodecki, "Answers to Your Top 3 Questions About Adaptive Authentication", Product & Technology, <https://www.onelogin.com/blog/answers-to-your-top-3-questions-about-adaptive-authentication>, 5 pages.
(Continued)

*Primary Examiner* — Victor Lesniewski
(74) *Attorney, Agent, or Firm* — Banner & Witcoff, Ltd.

(57) ABSTRACT

Methods, systems, and apparatuses are described herein for improving the security of personal information by preventing attempts at gleaning personal information from authentication questions. A computing device may receive a request for access to an account associated with a user. The request may comprise candidate authentication information. Based on comparing the candidate authentication information with the account data, the computing device may generate a synthetic authentication question. The synthetic authentication question may be generated as if the candidate authentication information is valid. A response to the synthetic authentication question may be received, and the request for access to the account may be denied.

20 Claims, 6 Drawing Sheets

(52) U.S. Cl.
CPC ........ *H04L 63/083* (2013.01); *H04L 63/0838* (2013.01); *H04L 63/0892* (2013.01); *H04L 63/102* (2013.01)

(56) References Cited

U.S. PATENT DOCUMENTS

| | | | |
|---|---|---|---|
| 11,593,466 | B1 | 2/2023 | Kuttappa et al. |
| 11,960,592 | B2* | 4/2024 | Maiman ................ H04L 63/102 |
| 2009/0037983 | A1 | 2/2009 | Chiruvolu et al. |
| 2014/0189829 | A1 | 7/2014 | McLachlan et al. |
| 2015/0161366 | A1 | 6/2015 | Ghosh et al. |
| 2017/0048230 | A1 | 2/2017 | Johansson et al. |
| 2017/0078262 | A1 | 3/2017 | Riddick |
| 2017/0180986 | A1 | 6/2017 | Mohan |
| 2019/0268331 | A1 | 8/2019 | Toth et al. |
| 2019/0297071 | A1 | 9/2019 | Canavor et al. |
| 2020/0065459 | A1 | 2/2020 | Himabindu et al. |
| 2020/0104820 | A1* | 4/2020 | Dsouza ................ G06N 3/042 |
| 2020/0297264 | A1 | 9/2020 | Asano |
| 2021/0019440 | A1 | 1/2021 | Abad et al. |
| 2021/0099458 | A1 | 4/2021 | Su et al. |
| 2021/0264437 | A1 | 8/2021 | Flowers et al. |

OTHER PUBLICATIONS

Madden, "Idaptive is taking machine learning for authentication and applying it to authorization," date of publication unknown but, prior to Jun. 29, 2021, <https://searchsecurity.techtarget.com/opinion/ldaptive-is-taking-machine-learning-for-authentication-and-applying-it-to-authorization>, 7 pages.

May 24, 2018, Steensen, "Machine Learning in the Payments Industry," VISA, 34 pages.

Feb. 25, 2021, Chuprina, "Credit Card Fraud Detection: Top ML Solutions in 2021," SPD Stories, Machine Learning, <https://spd.group/machine-learning/credit-card-fraud-detection/>, 23 pages.

Sep. 17, 2019, "AI and Machine Learning in Finance: Use Cases in Banking, Insurance, Investment, and CX," <https://www.altexsoft.com/blog/datascience/machine-learning-use-cases-in-finance/>, 10 pages.

Bani-Hani, et al., "Online Authentication Methods Used in Banks and Attacks Against These Methods," ScienceDirect, Procedia Computer Science 151 (2019) 1052-1059, The 6th International Workshop on Machine Learning and Data Mining for Sensor Networks (MLDM-SN), date of publication unknown but, prior to Jun. 29, 2021, 8 pages.

Jun. 15, 2017, Laverty, "What is User Enumeration?" <https://www.rapid7.com/blog/post/2017/06/15/about-user-enumeration/>, 15 pages.

"Avoiding user enumeration," Hacksplaining, date of publication unknown but, prior to Jun. 29, 2021, <https://www.hacksplaining.com/prevention/user-enumeration>, 3 pages.

Apr. 2, 2020, Pankov, "Enumeration attack dangers," <https://usa.kapersky.com/blog/username-enumeration-attack/21337/, 1 page.

Mar. 13, 2019, Kh, "Is Machine Learning Solving User Authentication Challenges in App Development?" <https://dataflo.com/read/machine-learning-solving-user-authentication-apps/6152>, 13 pages.

Feb. 24, 2019, McDonald, "How I Setup my SSH Honeypot," <https://medium.com/@rockprofile/how-i-setup-my-ssh-honeypot-b34b2bd3fba9>, 6 pages.

Oct. 7, 2022—(WO) International Search Report and Written Opinion—App No. PCT/US2022/035308.

Tiwari, P.K. et al. "Behaviour Based Authentication: A New Login Strategy for Smartphones" Second International Conference on Advanced Computational and Communication Paradigms (ICACCP), Gangtok, India, 10.1109/ICACCP.2019.8882897, Year 2019, 7 pages.

K. Skracic et al. "Question based user authentication in commercial environments" 2014 37th International Convention on Information and Communication Technology, Electronics and Microelectronics (MIPRO), Opatija, Croatia, 2014, pp. 1422-1427, 10.1109/MIPRO.2014.6859790.

\* cited by examiner

PREVENTING UNAUTHORIZED ACCESS TO PERSONAL DATA DURING AUTHENTICATION PROCESSES

CROSS REFERENCE TO RELATED APPLICATIONS

This application is a continuation of U.S. application Ser. No. 17/362,045, entitled "Preventing Unauthorized Access to Personal Data During Authentication Processes," filed Jun. 29, 2021, which issued as U.S. Pat. No. 11,960,592. The contents of the above listed application is expressly incorporated herein by reference in its entirety for any and all non-limiting purposes.

FIELD OF USE

Aspects of the disclosure relate generally to authentication of computing devices. More specifically, aspects of the disclosure may provide for improvements in the method in which authentication is performed such that unauthorized users are prevented from being able to glean personal information through authentication questions and the manner in which those authentication questions are presented.

BACKGROUND

As part of determining whether to grant a user device access to content (e.g., a website containing personal information, such as banking information), a user of the user device might be prompted with one or more authentication questions. Such questions might relate to, for example, a password of the user, a personal identification number (PIN) of the user, or the like. Those questions might additionally and/or alternatively be generated based on personal information of the user. For example, when setting up an account, a user might provide a variety of answers to predetermined questions (e.g., "Where was your father born?," "Who was your best friend in high school?"), and those questions might be presented to the user as part of an authentication process. As another example, a commercially-available database of personal information might be queried to determine personal information for a user (e.g., their birthdate, birth state, etc.), and that information might be used to generate an authentication question (e.g., "Where were you born, and in what year?").

As part of authenticating a computing device, information about financial transactions conducted by a user of that computing device might be used to generate authentication questions as well. For example, a user might be asked questions about one or more transactions conducted by the user in the past (e.g., "Where did you get coffee yesterday?," "How much did you spend on coffee yesterday?," or the like). Such questions might prompt a user to provide a textual answer (e.g., by inputting an answer in a text field), to select one of a plurality of answers (e.g., select a single correct answer from a plurality of candidate answers), or the like. In some instances, the user might be asked about transactions that they did not conduct. For example, a computing device might generate a synthetic transaction (that is, a fake transaction that was never conducted by a user), and ask a user to confirm whether or not they conducted that transaction. Authentication questions can be significantly more useful when they can be based on either real transactions or synthetic transactions: after all, if every question related to a real transaction, a nefarious user could use personal knowledge of a legitimate user to guess the answer, and/or the nefarious user might be able to glean personal information about the legitimate user.

A significant problem with using real financial transactions to generate authentication questions is that, in some instances, nefarious parties might use these authentication questions to validate authentication credentials and/or to learn personally identifying information about a user. For example, to learn about the shopping habits of a user, a malicious actor might try to repeatedly log-in to a website, eventually discerning which authentication questions presented to them are based on actual (real) transactions versus those that reflect synthetic transactions and thereby learning about transactions previously conducted by a user. This information might eventually be used to better guess answers to the authentication questions, which might ultimately allow the malicious actor to correctly answer later authentication questions. Additionally and/or alternatively, a malicious actor might be able to test whether stolen authentication credentials are genuine based on the specificity of authentication questions. For example, a malicious actor might use stolen authentication credentials to try to authenticate with an Interactive Voice Response (IVR) system. If the authentication questions asked in response to those authentication credentials appear specific (e.g., "Did you spend $20 at Store A on Wednesday?"), this might suggest to the malicious actor that the authentication credentials used are legitimate. In contrast, if the questions asked by the IVR system appear relatively less specific (e.g., "Where is your hometown?"), this might suggest to the malicious actor that the authentication credentials are not genuine, and that the system is defaulting to generic authentication questions before denying access.

Aspects described herein may address these and other problems, and generally improve the quality, efficiency, and speed of computer authentication systems by structuring an authentication process in a way that prevents nefarious parties from gleaning information about a legitimate user via authentication questions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for improvements in the manner in which authentication questions are presented so as to prevent nefarious parties from gleaning information about a user (e.g., past transactions conducted by the customer). As will be described in further detail below, as part of authenticating a user to access an account (via, e.g., a website, an IVR system, or the like), a computing device might determine whether candidate authentication information (e.g., a password provided by a user device trying to log in to a website) corresponds to authentication information stored in a database (e.g., the correct password). If at least a portion of the candidate authentication information does not correspond to the authentication information stored in the database, then the computing device may generate a synthetic authentication question that indicates that the candidate authentication information is valid. In this way, authentication questions might be provided in a substantially similar manner whether or not the candidate authentication information is valid. This ultimately may prevent a nefarious user from using the way in which authentication questions are presented to learn personal information about a user and/or to test whether the candidate authentication information is valid.

More particularly, some aspects described herein may provide a computer-implemented method for generating a synthetic authentication question. A computing device may receive a request for access to an account associated with a user, wherein the request for access comprises candidate authentication information associated with the account. The computing device may query an account database for account data corresponding to the account. In response to determining, based on comparing the candidate authentication information with the account data, that a first portion of the candidate authentication information does not correspond to the account, the computing device may generate, based on the candidate authentication information and the account data, a synthetic authentication question, wherein the synthetic authentication question indicates that the first portion of the candidate authentication information is valid. The computing device may then receive a candidate response to the synthetic authentication question. The computing device may then deny access to the account.

According to some embodiments, generating the synthetic authentication question may comprise providing, as input to a trained machine learning model, the candidate authentication information and the account data, wherein the trained machine learning model is trained based on a plurality of accounts, and receiving, as output from the trained machine learning model and based on the input, a synthetic account, wherein generating the synthetic authentication question is based on the synthetic account. Generating the synthetic authentication question may comprise querying, based on the account data, the account database for one or more second accounts similar to the account, and determining second account data corresponding to the one or more second accounts, wherein generating the synthetic authentication is further based on the second account data. Generating the synthetic authentication question may comprise generating the synthetic authentication question using a same algorithm as used to generate legitimate authentication questions. Generating the synthetic authentication question may comprise generating, based on the candidate authentication information and the account data, a synthetic transaction, wherein the synthetic authentication question relates to the synthetic transaction. Generating the synthetic authentication question may comprise determining a pattern of transactions conducted by the account, wherein generating the synthetic authentication question is based on the pattern of transactions. The method may additionally comprise determining an origin of the request for access to the account associated with the user, wherein generating the synthetic authentication question is further based on the origin. The method may additionally comprise determining an average time to generate and provide legitimate questions for the account; and providing, based on the average time, the synthetic authentication question. Generating the synthetic authentication question may be based on determining, based on one or more properties of the request for access to the account associated with the user, that the request was received from a malicious actor.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving the manner in which authentication questions are provided during an authentication process. In particular, the approaches described herein prevent nefarious parties from using authentication processes to learn information about a user and/or to test the validity of authentication credentials.

As an example of one problem addressed by the current disclosure, a malicious actor might acquire a stolen username and password for a financial account. The malicious actor might then call in to an IVR system and verbally provide the username and/or password to initiate an authentication process. The malicious actor might then be asked a variety of authentication questions. The nature of these authentication questions might indicate, to the malicious actor, whether or not the stolen username and password are still valid. For example, if the system asks specific authentication questions (e.g., "Where did you purchase coffee on Wednesday?"), this might indicate that the stolen username and password are valid and correspond with a real financial account. In contrast, if the system asks generic questions (e.g., "What is your father's middle name?"), this might indicate that the stolen username and password might no longer be valid and/or might not correspond with a real financial account. Such a circumstance is undesirable because, in effect, the process of authenticating a user might provide a malicious actor tools for discerning whether they might eventually gain access to an account.

As an example of another problem addressed by the current disclosure, a malicious actor might acquire a stolen username and password for a financial account. The malicious actor might then call in to an IVR system and provide the username and/or password to initiate an authentication process. The malicious actor might then be asked a variety of authentication questions. Over time (e.g., across multiple authentication questions and/or authentication attempts), the malicious actor might log which questions they are asked, ultimately building a profile of the user. While some of the authentication questions might relate to transactions that a user did not conduct, the logging of the questions over time might allow the malicious actor to eventually discern between authentication questions premised on real transactions and authentication questions premised on synthetic (e.g., fake) transactions.

Aspects described herein improve the functioning of computers by improving the accuracy and security of computer-implemented authentication processes. The steps described herein recite improvements to computer-implemented authentication processes, and in particular improve the security of such processes such that they cannot be used to glean personal data about a user and/or to test the validity of stolen authentication credentials. This is a problem specific to computer-implemented authentication processes, and the processes described herein could not be performed in the human mind. For example, as will be described in further detail below, the processes described herein rely on the detection of invalid authentication credentials and the computer-implemented generation of synthetic authentication questions which behave as if the authentication credentials are valid.

Before discussing these concepts in greater detail, however, several examples of a computing device that may be used in implementing and/or otherwise providing various aspects of the disclosure will first be discussed with respect to FIG. 1.

Figure 1:
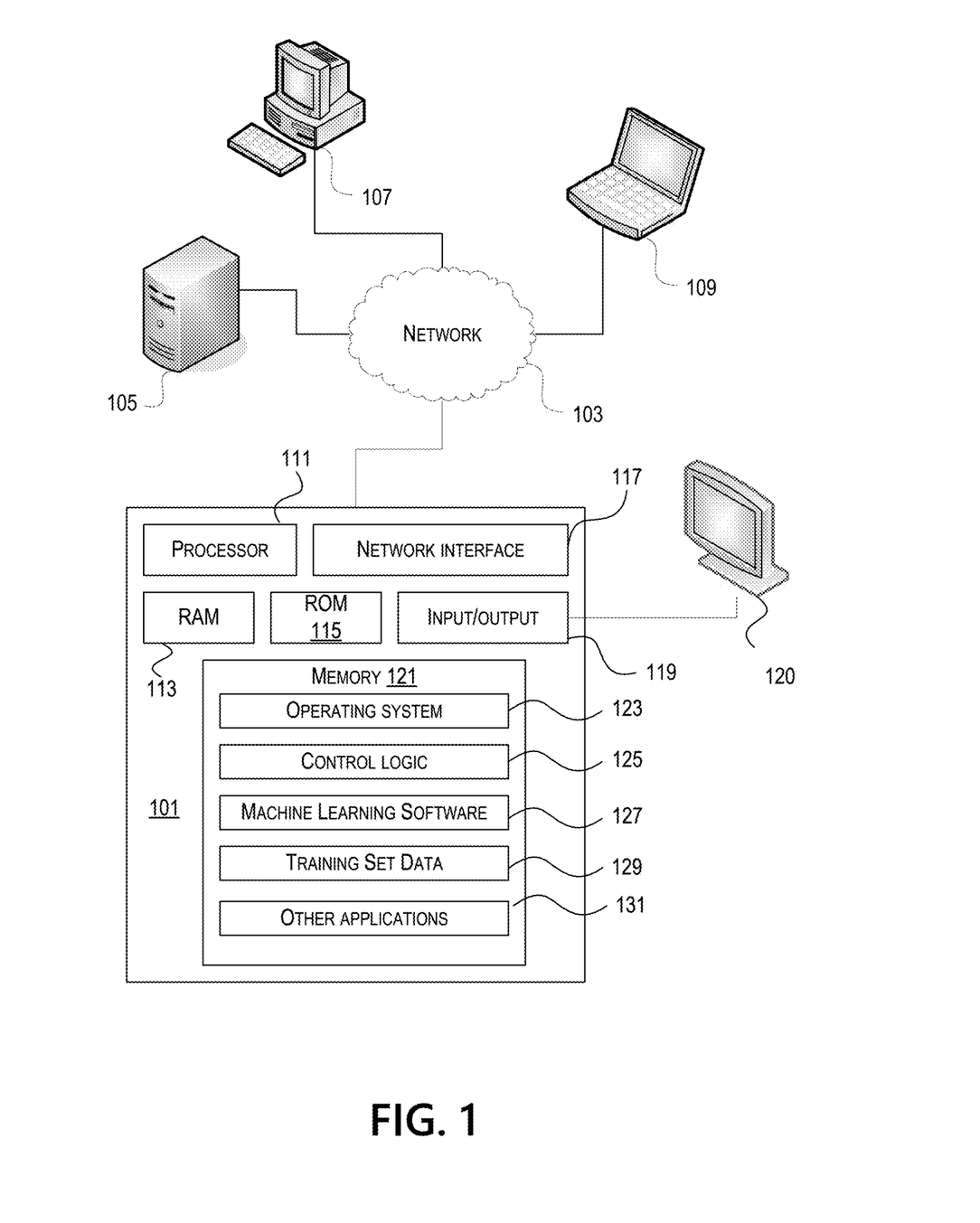
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
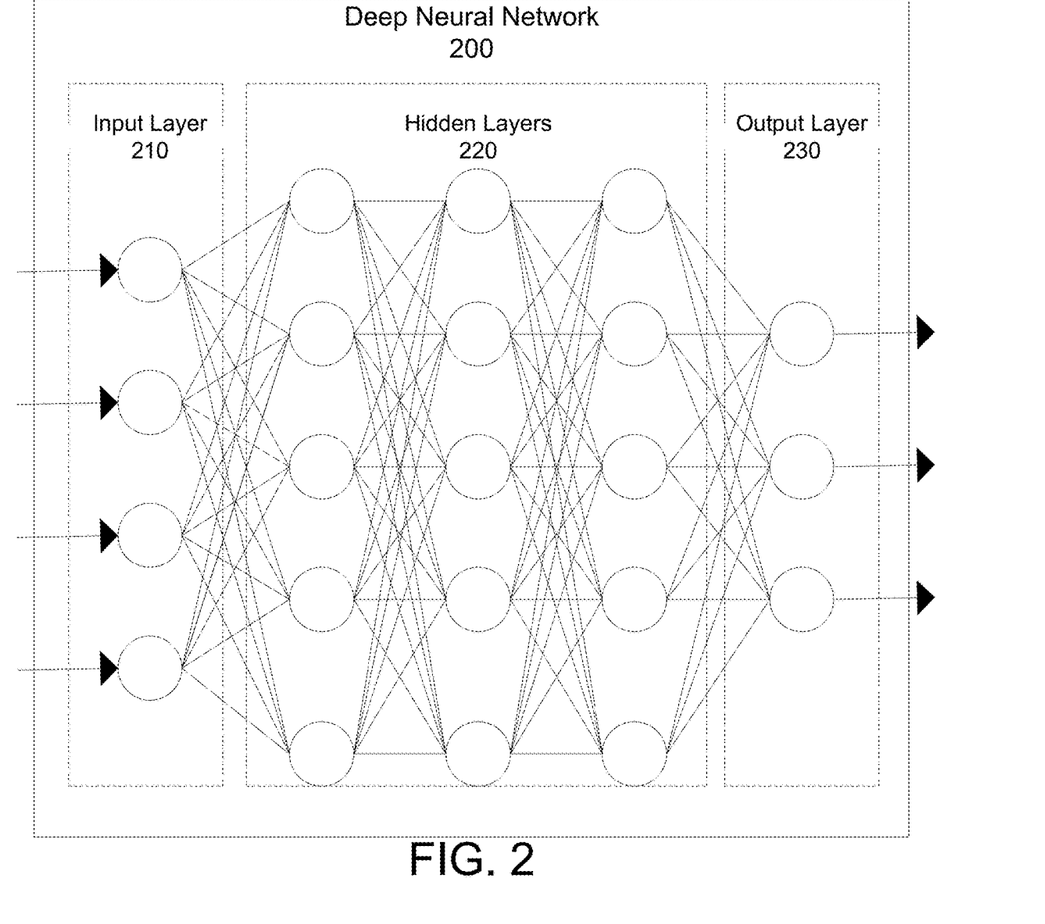
FIG. 2 depicts an example deep neural network architecture for a model according to one or more aspects of the disclosure.

FIG. 2 illustrates an example deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
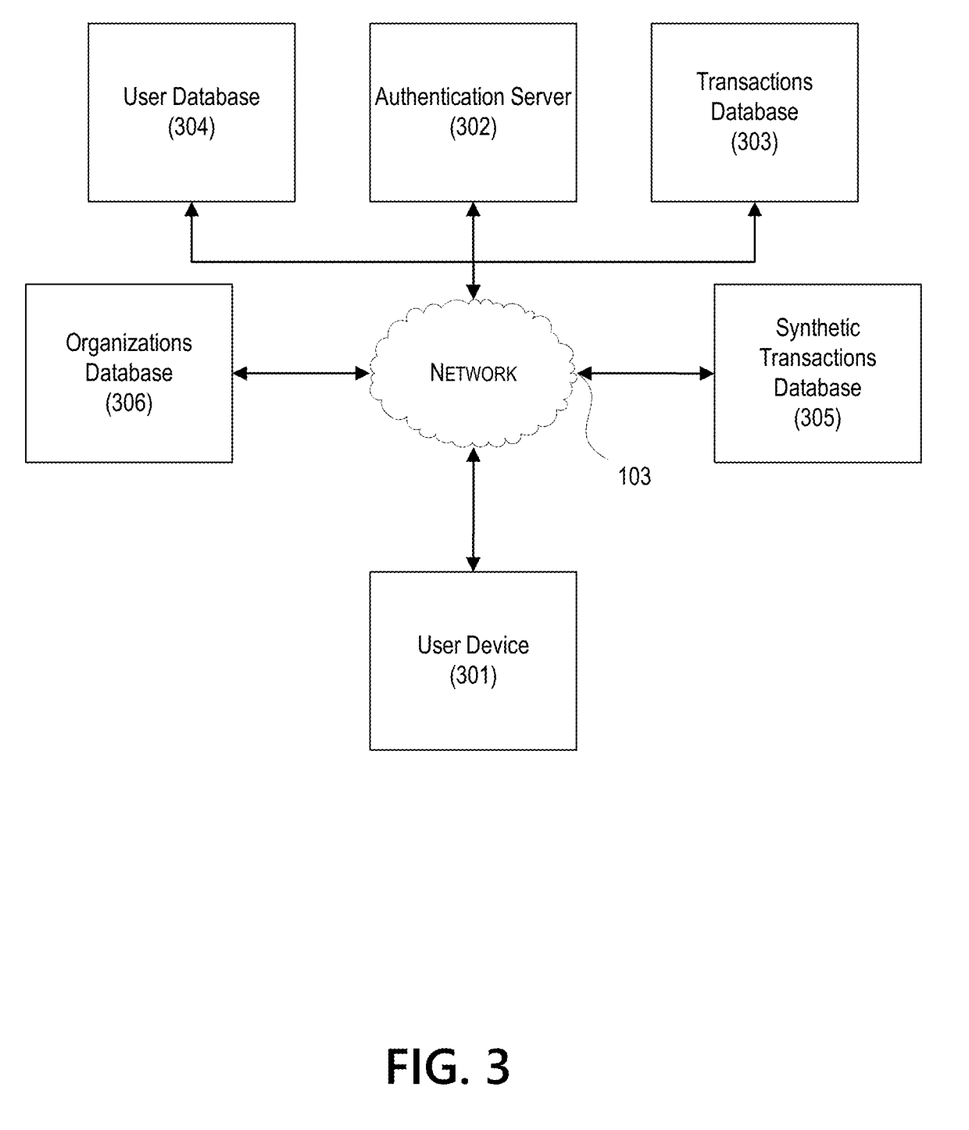
FIG. 3 depicts a system comprising different computing devices that may be used in implementing one or more aspects of the disclosure in accordance with one or more illustrative aspects discussed herein.

FIG. 3 depicts a system for authenticating a user device 301. The user device 301 is shown as connected, via the network 103, to an authentication server 302, a transactions database 303, a user database 304, a synthetic transactions database 305, and an organizations database 306. The network 103 may be the same or similar as the network 103 of FIG. 1. Each of the user device 301, the authentication server 302, the transactions database 303, the user database 304, the synthetic transactions database 305, and/or the organizations database 306 may be one or more computing devices, such as a computing device comprising one or more processors and memory storing instructions that, when executed by the one or more processors, perform one or more steps as described further herein. For example, any of those devices might be the same or similar as the computing devices 101, 105, 107, and 109 of FIG. 1.

As part of an authentication process, the user device 301 might communicate, via the network 103, to access the authentication server 302 to request access (e.g., to a user account). The user device 301 shown here might be a smartphone, laptop, or the like, and the nature of the communications between the two might be via the Internet, a phone call, or the like. For example, the user device 301 might access an IVR system associated with the authentication server 302, and the user device 301 might provide (e.g., over a phone call) candidate authentication credentials to that IVR system. The authentication server 302 may then determine whether the authentication credentials are valid. For example, the authentication server 302 might compare the candidate authentication credentials received from the user device 301 with authentication credentials stored by the user database 304. In the circumstance where one or more portions of the candidate authentication credentials received from the user device 301 do not correspond to the authentication credentials stored by the user database 304, the authentication server 302 may take steps to nonetheless continue the authentication process as if the candidate authentication credentials were valid. For instance, the authentication server 302 might provide the user device 301 a synthetic authentication question. This synthetic authentication question might be generated based on the candidate authentication credentials and/or data stored by the synthetic transactions database 305, and may be configured to suggest that the candidate authentication credentials provided by the user device 301, though incorrect, are genuine.

The user database 304 may store information about one or more user accounts, such as a username, password, demographic data about a user of the account, or the like. For example, as part of creating an account, a user might provide a username, a password, and/or one or more answers to predetermined authentication questions (e.g., "What is the name of your childhood dog?"), and this information might be stored by the user database 304. The authentication server 302 might use this data to generate authentication questions. The user database 304 might store demographic data about a user, such as their age, gender, location, occupation, education level, income level, and/or the like. The user database 304 might additionally and/or alternatively store preferences for one or more user accounts relating to authentication. For example, the user database 304 might store preferences indicating that certain users are required to use two-factor authentication as part of authentication.

The transactions database 303 might comprise data relating to one or more transactions conducted by one or more financial accounts associated with a first organization. For example, the transactions database 303 might maintain all or portions of a general ledger for various financial accounts associated with one or more users at a particular financial institution. The data stored by the transactions database 303 may indicate one or more merchants (e.g., where funds were spent), an amount spent (e.g., in one or more currencies), a date and/or time (e.g., when funds were spent), or the like. The data stored by the transactions database 303 might be generated based on one or more transactions conducted by one or more users. For example, a new transaction entry might be stored in the transactions database 303 based on a user purchasing an item at a store online and/or in a physical store. As another example, a new transaction entry might be stored in the transactions database 303 based on a recurring charge (e.g., a subscription fee) being charged to a financial account. As will be described further below, synthetic transactions might be based, in whole or in part, on legitimate transactions reflected in data stored by the transactions database 303. In this way, the synthetic transactions might better emulate real transactions.

The account data stored by the user database 304 and the transactions database 303 may, but need not be related. For example, the account data stored by the user database 304 might correspond to a user account for a bank website, whereas the financial account data stored by the transactions database 303 might be for a variety of financial accounts (e.g., credit cards, checking accounts, savings accounts) managed by the bank. As such, a single user account might provide access to one or more different financial accounts, and the accounts need not be the same. For example, a user account might be identified by a username and/or password combination, whereas a financial account might be identified using a unique number or series of characters.

The synthetic transactions database 305 may comprise data which enables the authentication server 302 to present synthetic authentication questions which appear real based on candidate authentication information. The synthetic transactions database 305 might comprise data for one or more templates which may be used, in conjunction with the candidate authentication information, to generate a synthetic authentication question. For example, if the candidate authentication information comprises a first name of the user, then a template might indicate that the name should be used as part of the question (e.g., "Hi Jenn! Which of these transactions did you conduct last week?") so as to make it appear that the candidate authentication information is valid. The synthetic transactions database 305 might additionally and/or alternatively comprise one or more predetermined synthetic transactions for use as part of a synthetic authentication question. A synthetic authentication question might then be generated based on the synthetic transaction. For example, for a synthetic transaction indicating a $10 purchase at a coffee shop on Wednesday, the authentication question could be, e.g., "Where did you spent $10 last Wednesday?," "How much did you spend at the coffee shop last Wednesday?," or the like. The synthetic transitions might be configured to appear realistic and recent as, otherwise, they might easily be detected as fake. Moreover, the number of synthetic transactions stored by the synthetic transactions database 305 may be high: after all, if too few synthetic transactions are used, then a nefarious user might eventually be able to identify such synthetic transactions through their re-use during authentication of different users. The synthetic transactions database 305 might additionally and/or alternatively comprise instructions for generating realistic synthetic transactions and/or synthetic authentication questions. For example, the synthetic transactions database 305 might comprise code that, when executed, randomly generates a realistic transaction. As will be indicated below, these instructions might randomly select organizations from a list of organizations stored by the organizations database 306. As part of generating such synthetic transactions, real transactions (e.g., as stored in the transactions database 303) might be analyzed. In this manner, real transactions might be used to make synthetic transactions appear more realistic.

The organizations database 306 might store data relating to one or more organizations, including indications (e.g., names) of organizations, aliases of the organizations, and the like. That data might be used to generate authentication questions that comprise both correct answers (e.g., based on data from the transactions database 303 indicating one or more organizations where a user has conducted a transaction) and synthetic transactions (e.g., based on data from the organizations database 306, which might be randomly-selected organizations where a user has not conducted a transaction and which might indicate violations of a transaction rule). For example, a computing device might, as part of randomly generating a synthetic transaction using instructions provided by the synthetic transactions database 305, generate a synthetic transaction by querying the organizations database 306 for a list of organizations, then removing, from that list, organizations represented in the data stored by the transactions database 303.

Figure 4A:
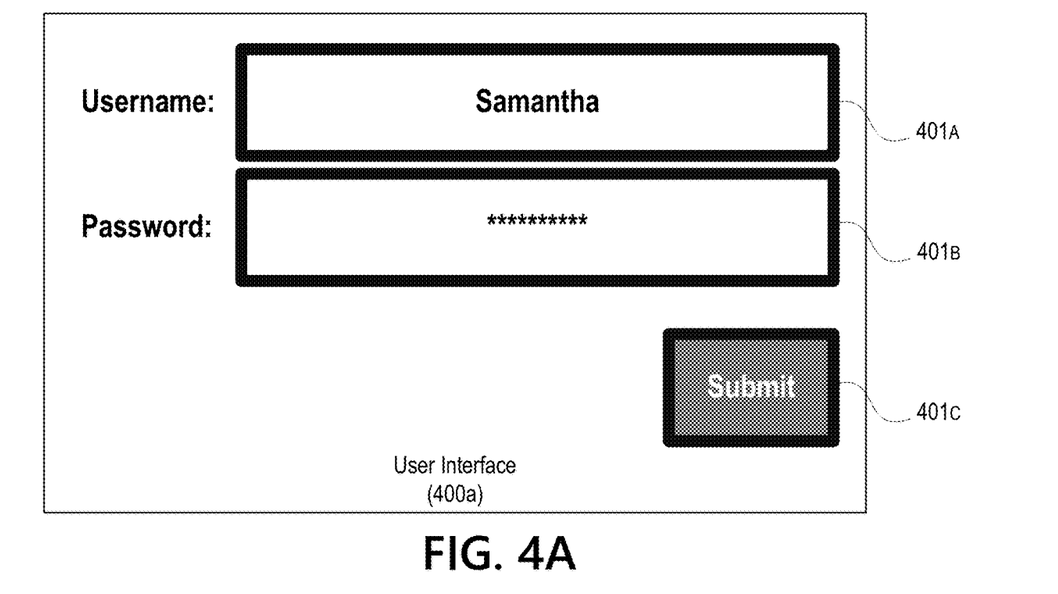
FIG. 4A depicts a user interface for authenticating access, by a user, to a financial account using a username and password.

FIG. 4A depicts an illustrative user interface 400a comprising a username field 401a, a password field 401b, and a submit button 401c. The user interface 400a might be provided by, e.g., the authentication server 302 as part of determining, using data stored by the user database 304, whether to provide the user device 301 access to an account. For example, a user might be prompted to type in a candidate username into the username field 401a and a candidate password into the password field 401b, and the user might be provided access to an account based on whether the candidate username and the candidate password match data stored by the user database 304. As such, the user interface 400a depicts a circumstance where a user is provided two different authentication questions: specifically, as shown in FIG. 4A, they are prompted to provide both a valid username and a valid password.

Though FIG. 4A depicts a visual user interface (e.g., such as may be displayed by a website or an application executing on a computing device), aspects described herein may additionally and/or alternatively be implemented in non-visual systems, such as a telephone-based IVR system. In a telephone-based IVR system, a user might provide authentication credentials orally, using a touch-tone keypad, or the like.

Figure 4B:
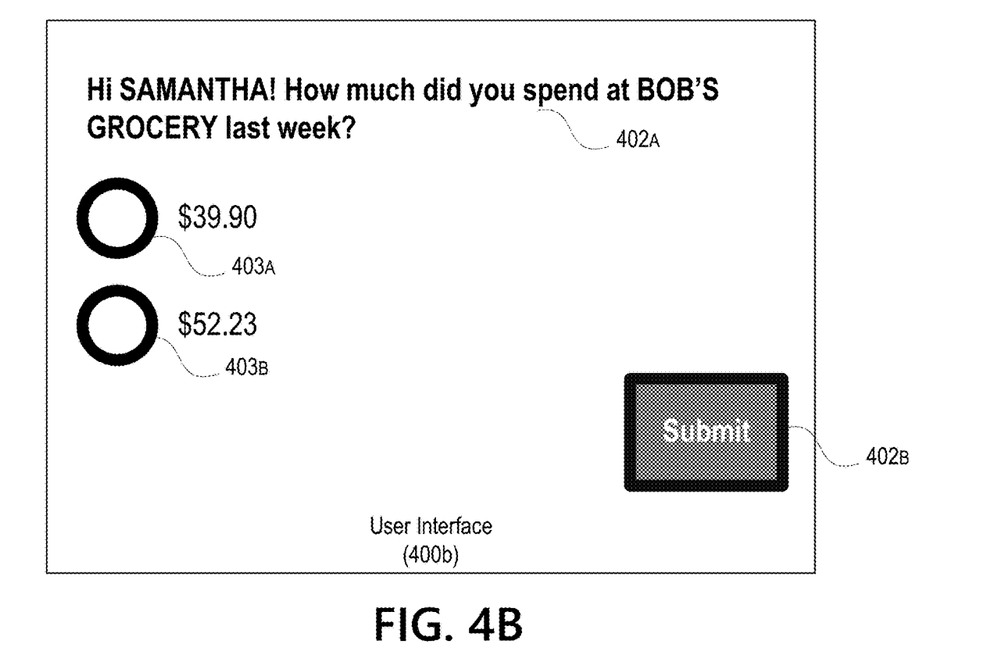
FIG. 4B depicts a user interface comprising an authentication question that has been generated based on a synthetic transaction that violates a transaction rule.

FIG. 4B depicts a user interface 400b comprising an authentication question 402a which allows a user to select one of a plurality of options 403a-403b and submit the selection using a submit button 402b. As previously discussed, an authentication question, such as the authentication question 402a, might be generated in a manner that appears as if the authentication credentials provided by a user are genuine, whether or not those authentication credentials are genuine. For example, the authentication credentials (e.g., the username "Samantha" and the accompanying password) depicted in FIG. 4A might be incorrect. The plurality of options 403a-403b might comprise one or more correct answers and one or more incorrect answers. That said, where a user has provided invalid candidate authentication credentials, none of the options 403a-403b may be correct: after all, the authentication question 402a may be a synthetic authentication question (e.g., as generated based on data stored by the synthetic transactions database 305). In this way, authentication questions might appear substantially the same whether or not the authentication credentials are correct and whether or not they are based on real transactions.

FIG. 4B illustrates that authentication questions, such as the authentication question 402a, might be generated in a manner that appears genuine whether or not the authentication credentials are genuine and whether or not the authentication questions are generated based on real data. Using the instructions from the synthetic transactions database 305, a computing device might generate a synthetic authentication question that appears to a nefarious user to be genuine, thereby preventing that nefarious user from learning whether the candidate authentication credentials they used are genuine. To generate such a realistic synthetic authentication question, a computing device (e.g., the authentication server 302) might use algorithms (e.g., as provided by the synthetic transactions database) to generate a synthetic transaction. Such a synthetic transaction might be configured to be similar to real transactions (e.g., as reflected in data stored by the transactions database 303) and might relate to real-life organizations (e.g., stores indicated in data stored by the organizations database 306).

Having discussed several examples of computing devices and user interfaces which may be used to implement some aspects as discussed further below, discussion will now turn to a method for generating and presenting synthetic authentication questions in circumstances where, e.g., authentication credentials are not valid.

Figure 5:
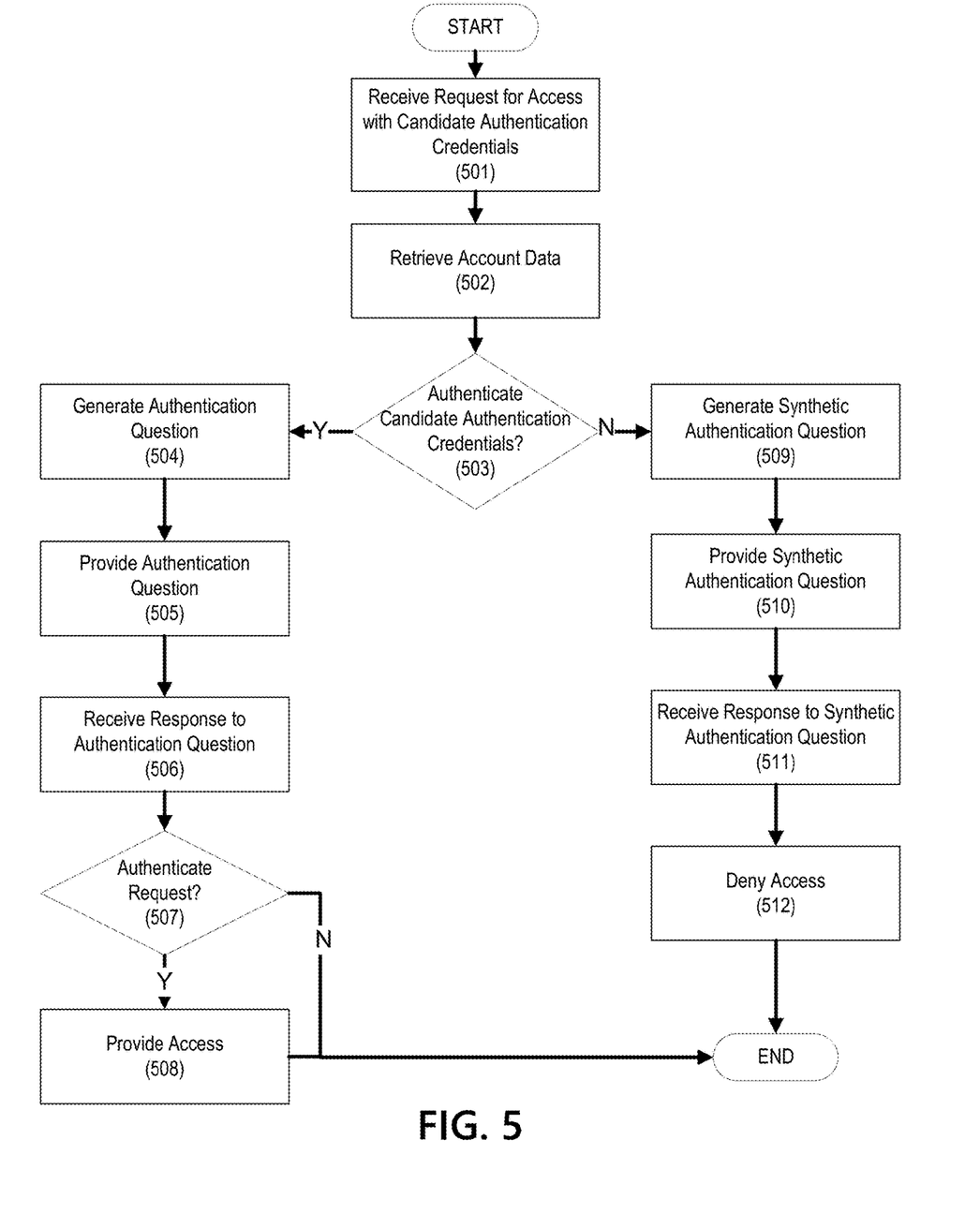
FIG. 5 depicts a flow chart comprising steps which may be performed for providing authentication questions, and in particular details how synthetic authentication questions might be generated and provided.

FIG. 5 illustrates an example method 500 for generating authentication questions in accordance with one or more aspects described herein. The method 500 may be implemented by a suitable computing system, as described further herein. For example, the method 500 may be implemented by any suitable computing environment by a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps of FIG. 5. The method 500 may be implemented in suitable program instructions, such as in machine learning software 127, and may operate on a suitable training set, such as training set data 129. The steps shown in the method 500 are illustrative, and may be re-arranged or otherwise modified as desired.

In step 501, a computing device might receive a request for access. The request for access might be for an account associated with a user. The request for access might be associated with a user accessing, via a user device, a website, a log-in screen, or the like. Additionally and/or alternatively, the request for access might be associated with a customer accessing an IVR system or similar telephonic system. The request for access might comprise a request for access to an account, such as a financial services account, a banking account, or the like. The request for access might comprise, for instance, a user clicking a "Log In" button on a website. With that said, the request for access need not originate in any particular format or manner. The request for access to the account may comprise candidate authentication credentials, such as a username, a password, or the like. For example, a user might orally speak a username and/or password over the phone to an IVR system.

In step 502, the computing device may retrieve account data. The account data may be retrieved from the user database 304. For example, the computing device may query an account database for account data corresponding to the account to determine account data for one or more accounts. In this manner, the computing device might retrieve genuine account data, using which it might compare (later, in step 503) against the candidate authentication data. That said, because the candidate authentication data might not necessarily correspond to any valid accounts, step 502 might be entirely omitted, and the computing device might instead use the candidate authentication information (once properly sanitized to remove any possible attempts at script injections) to query the user database 304 directly.

In step 503, the computing device may determine whether to authenticate the candidate authentication credentials received in step 501. The computing device may compare the candidate authentication information (e.g., received in step 501) with account data (e.g., as retrieved from the user database 304 in step 502). Based on that comparison, the computing device may determine whether one or more portions of the candidate authentication information correspond to the authentication data. In the event that one or more portions of the candidate authentication information does not correspond to any account (e.g., does not correspond to account data sorted by the user database 304), then the computing device may determine to not authenticate the candidate authentication credentials. For example, the candidate authentication credentials might provide a valid username but an incorrect pass word, such that the computing device may determine to not authenticate the candidate authentication credentials. On the other hand, if all portions of the candidate authentication information correspond to one or more accounts, then the computing device may determine to authenticate the candidate authentication credentials. If the computing device determines to authenticate the candidate authentication credentials, the method 500 proceeds to step 504. Otherwise, the method proceeds to step 509.

Step 504 through step 508 illustrate a circumstance where the request for access received in step 501 provides genuine authentication credentials. In such a circumstance, the user might be authenticated using authentication questions and, based on responses to those questions, the user might be provided access to the account. As will be described in greater detail below, it may be desirable to mirror this process if the authentication credentials are not genuine, as doing so helps prevent an unauthorized user from detecting whether the authentication credentials used are genuine. As such, steps 504 through 508 illustrate a process that the system might attempt to mimic (at least from the perspective of a malicious user) in steps 509 through 512.

In step 504, the computing device may generate an authentication question. The authentication question generated in step 504 might be based on real transactions conducted using an account (e.g., as indicated by data stored by the transactions database 303) and/or might be based on one or more synthetic transactions (e.g., generated via instructions stored by the synthetic transactions database 305). The authentication question may prompt the user to identify whether a transaction is genuine, or might otherwise ask the user to correctly indicate that a transaction never occurred. For example, the authentication question might ask the user whether they conducted a synthetic transaction, such that the correct answer is "No." Additionally and/or alternatively, the authentication question might ask the user to identify one or more genuine transactions from a list of genuine and synthetic transactions. For example, the authentication question might provide the user a list of four transactions (three synthetic, one genuine) and prompt the user to select, from the transactions, the genuine transaction. Additionally and/or alternatively, the authentication question might ask the user to either provide detail for a transaction and/or indicate it is synthetic. For example, the authentication question might ask a user to specify when they conducted a synthetic transaction, and the user might be prompted to either provide a day of the week (any of which would be an incorrect answer) or indicate that the transaction never occurred (the correct answer).

Generating the authentication question may be based on a transaction history associated with an account. A transaction history might be stored for a particular account in, for example, the transactions database 303. A transaction history might indicate a history of transactions conducted by the account, such as one or more purchases of goods and/or services at one or more merchants. A transaction history may indicate patterns of spending of a user, such as when they shop at particular merchants, how much they spend at a particular merchant or category of merchants, or the like. As such, the authentication question might be generated based on the transaction history in a manner that appears realistic given the user's transaction history, but which nonetheless would be recognized by the user as relating to a synthetic transaction. For example, if the transaction history indicates that a user frequently shops at a coffee shop in the morning, and if a transaction rule specifies that a credit card can be used for purchases no greater than fifteen dollars, the authentication question might ask a user if they purchased a twenty-dollar meal at the coffee shop in the evening. In that example, the authentication question might be identified, by a legitimate user, to relate to a synthetic transaction in at least two ways: first, because the legitimate user does not shop at the coffee shop in the evening, and second, because the legitimate user does not permit the credit card to be used for twenty-dollar transactions.

Generating the authentication question may entail use of a machine learning model. A machine learning model may be trained based on a plurality of transaction rules and a plurality of questions based on those rules. For example, a machine learning model might be trained based on a history of questions generated based on various transaction rules. As another example, the machine learning model might be provided a list of example questions along with various transaction rules which might correspond to those questions. In this manner, the machine learning model might learn how to formulate believable authentication questions which can nonetheless be recognized by a legitimate user as pertaining to a synthetic transaction. The computing device may provide, as input to a trained machine learning model, the one or more transaction rules. For example, the computing device might provide one or more transaction rules determined in step 502. The computing device may receive, as output from the trained machine learning model and based on the input, an authentication question. As such, the machine learning model might be configured to generate an authentication question based on transaction rules for an account.

Generating the authentication question may be based on accounts similar to the account for which access is requested in step 501. A computing device may query, using metadata corresponding to an account, an accounts database (e.g., the user database 304) to determine one or more second accounts similar to the account. Such a query might be based on demographic information associated with the user. For example, the user database 304 might be queried based on the age, location, and gender of the user to identify one or more other similar users (and, in turn, their accounts). Generating the authentication question may be based on historical transactions associated with the one or more second accounts. For example, even if transaction data for a particular user has no transaction data (e.g., because the account is very new), users in a particular demographic (e.g., single women in their thirties) might rarely shop at a golf store, but that same demographic might frequent local wineries. In such a circumstance, it might be advantageous to generate an authentication question for the particular user that pertains to the local wineries, but not golf stores. After all, should the authentication question pertain to golf stores, the answer (that is, that the user did not shop at the golf store) might be more readily guessed by an unauthorized user.

In step 505, the computing device may provide the authentication question to, e.g., a user device. Providing the authentication question may comprise causing display of the authentication question in a user interface, such as on a website, and/or via audio, such as via an IVR system.

In step 506, the computing device may receive a response to the authentication question. The response to the authentication question may be received from a user device. The answer might be a selection of a radio option, a written response in a text box, a user speaking into a microphone, or the like. The response need not be in any particular format.

In step 507, the computing device may determine, based on the response received in step 506, whether to authenticate the request for access. Determining whether to authenticate the request for access might be based on whether the response received in step 506 correctly answered the question provided in step 505. If the computing device decides to authenticate the request, the method 500 proceeds to step 508. Otherwise, the method 500 ends.

In step 508, based on determining to authenticate the request for access in step 507, access to an account may be provided. Providing access to the account might comprise providing a user (via, e.g., their user device) access to a protected part of a website, to encrypted data, or the like.

Step 509 through step 512 relate to the circumstance where the request for access in step 501 did not provide valid candidate authentication credentials. In this circumstance, it may be desirable to, from the perspective of the user, behave as if the credentials were valid. In this way, if a nefarious user is attempting to test whether the authentication credentials are valid (and/or is trying to learn more about a user by evaluating authentication questions), they will be unable to do so.

As an introduction to steps 509 through 512, there are at least two ways in which the candidate authentication credentials might not correspond to account data stored by, e.g., the user database 304. In some circumstances, the candidate authentication data may correspond to no real accounts. For example, a candidate username might not correspond to any usernames in a database stored by the user database 304. In these circumstances, the candidate authentication data might be said to not correspond to any legitimate accounts. In other circumstances, the candidate authentication data may partially, but not entirely, correspond to real accounts. For example, a candidate username might be correct and correspond to a legitimate account, but the password provided might be incorrect. In these circumstances, the candidate authentication might be said to partially correspond to a legitimate account. Steps 509 through 512 address either circumstance, though the circumstances might be handled differently. For example, as discussed below, if a candidate username corresponds to a legitimate account but a candidate password provided along with that candidate username is incorrect, metadata for the legitimate account might be used to generate synthetic authentication questions in step 509 such that the synthetic authentication question better mimics the circumstance where the password is correct.

In step 509, the computing device may generate a synthetic authentication question. The synthetic authentication question may be based on a synthetic transaction (e.g., a transaction that has not, in fact, been conducted by any user, and that has been generated by a computing device randomly or semi-randomly). The synthetic transaction may be generated in a manner that appears to be a legitimate transaction when used in the synthetic authentication question, as doing so may ensure that the synthetic authentication question appears to be legitimate to a nefarious user. To mimic real-life transactions, the synthetic transaction might be generated to be similar to one or more transactions reflected by the data stored by the transactions database 303. Where the candidate authentication credentials partially correspond to a legitimate account, the synthetic authentication question (e.g., a synthetic transaction upon which the synthetic authentication question might be based) might be generated based on metadata about the legitimate account (e.g., a first name associated with the account, a geographic region associated with the account) to help the synthetic authentication question appear more genuine. Additionally and/or alternatively, where the candidate authentication credentials to not correspond to any legitimate accounts, the synthetic authentication question might be entirely randomly generated based on, e.g., a randomly-generated user profile, and/or one or more randomly-selected transactions stored by the transactions database 303. Such a randomly-generated user profile might be stored and used to generate subsequent synthetic authentication questions any time similar authentication credentials are later provided so as to mimic a circumstance where the candidate authentication credentials are genuine.

The synthetic authentication question generated in step 509 may be configured to be similar to authentication questions that might be provided to a legitimate user (e.g., in step 505). As such, the same or similar algorithms used as part of generating the authentication question in step 505 might be used to generate the synthetic authentication question in step 509. For example, as part of step 505, an authentication question generation algorithm may be configured to take input data corresponding to a user account (e.g., their name and other demographics, past transactions indicated by data stored in the transactions database 303), and might generate a variety of authentication questions that ask about legitimate and synthetic transactions. That same authentication question generation algorithm might be used as part of step 509 (e.g., in the case where authentication credentials received in step 501 are not valid), except that the necessary inputs for the algorithm (e.g., the name and other demographics, past transactions) might be randomly generated based on the authentication credentials provided in step 501. While all synthetic authentication questions generated in step 509 might pertain to synthetic transactions, the authentication questions generated in step 504 might pertain to both synthetic transactions and real transactions conducted by an account. In this manner, the system might generate authentication questions for invalid credentials in the same way that authentication questions are generated for valid credentials, making it harder for nefarious parties to detect whether or not the credentials are valid or not.

Generating the synthetic authentication question may comprise use of a machine learning model. A machine learning model may aid in the computer-implemented generation of synthetic transactions (and, in turn, synthetic authentication questions) by being trained using a plurality of legitimate accounts and/or authentication questions, then using that training to generate synthetic transactions and/or synthetic authentication questions that appear genuine. For example, a machine learning model may be trained using data that comprises account data (e.g., account metadata, such as demographics of users for an account) and data that indicates authentication questions that have been generated for those accounts. Such data may be stored in the user database 304. Additionally and/or alternatively, such input data might comprise past transactions, such as might be indicated by data stored in the transactions database 303. The computing device may then provide, as input to a trained machine learning model, candidate authentication information. Additionally and/or alternatively, where the candidate authentication information corresponds in part to a legitimate account, the computing device may provide the trained machine learning model account data corresponding to the legitimate account from, e.g., the user database 304. The computing device may receive, as output from the trained machine learning model and based on the input, a synthetic account. A synthetic account might comprise a synthetic name and synthetic personal details. That said, some aspects of the synthetic account might be based on real data: for example, the synthetic account might comprise a fake address in a real city, a fake telephone number with a real area code, or the like. The synthetic authentication question may be based on the synthetic account. For example, based on demographics of the synthetic account, a synthetic transaction might be generated, and a synthetic authentication question might be generated based on that synthetic transaction.

In circumstances where the candidate authentication data corresponds to a legitimate account stored by, e.g., the user database 304, generating the synthetic authentication question may be based on accounts similar to the legitimate account. In this manner, the computing device can avoid exposing personal data for the legitimate account, but might instead use an amalgamation of similar data to form synthetic authentication questions. For example, the computing device may query, based on account data for an account (as, e.g., stored in the user database 304), the account database (e.g., the user database 304) for one or more second accounts similar to the account. The computing device may then determine second account data corresponding to the one or more second accounts. That data might be, for example, a collection of different locations, purchasing habits, or the like. The computing device may then generate the synthetic authentication question based on the second account data.

In circumstances where the candidate authentication data corresponds to a legitimate account stored by, e.g., the user database 304, generating the synthetic authentication question may comprise determining a pattern of transactions conducted by the legitimate account (and/or similar accounts, as discussed in the paragraph above) and generating the synthetic authentication question based on the pattern of transactions. A nefarious user might attempt to acquire access to an account to, via authentication questions asked during an authentication process, learn about transactions conducted by that user. As such, the synthetic authentication questions may be generated to appear as if they reflect real data corresponding to a legitimate account but which were, in fact, generated using synthetic transactions. Such synthetic transactions might be generated based on a pattern of transactions conducted by the legitimate account, or accounts like it. For example, if a legitimate account frequently shops at a toy store on Saturdays, then the synthetic transaction might relate to shopping at the toy store on a Monday, such that a synthetic authentication question based on this synthetic transaction appears to, but does not in fact, reflect real account activity. As another example, a legitimate account might frequently purchase lunch on weekdays at a first restaurant, and a synthetic transaction might indicate purchase of lunch on a weekday, albeit at a different location. In that example, the synthetic authentication question might appear genuine to a nefarious user, but might not in fact reflect legitimate account activity.

Generating the synthetic authentication question may be based on an origin of the request for access to the account. The request for access received in step 501 might be received from a particular geographic or network location, such as from a particular Internet Protocol (IP) address, particular Global Positioning System (GPS) coordinates, area code, or the like. This information might inform whether or not the request for access is indicative of an attempt, by a malicious actor, to access an account. The computing device may determine an origin of the request for access to the account associated with the user. This might comprise, for example, determining an IP address from which the request for access received in step 501 originated. As another example, determining the origin of the request for access might be based on GPS coordinates of the user device 301, which might be required as part of the authentication process. Based on the origin of the request for access to the account, the computing device may generate the synthetic authentication question. For example, based on the geographic location of the request for access, the synthetic authentication question might be based on a synthetic transaction conducted at a nearby location. As another example, if the IP address indicated by the request for access is associated with untrusted activity (e.g., repeated hacking attempts), the synthetic authentication questions might be made more obtuse, more complicated, or the like.

The synthetic authentication question may be configured to be presented at a particular time and/or with particular time delays so as to mimic a legitimate authentication question. Nefarious users might be able to determine whether an authentication question reflects real data or is a synthetic authentication question based on how long it takes for the question to be generated, presented, or otherwise provided to the user device 301. For example, it might take less than half a second for the authentication server 302 to, using the synthetic transactions database 305, generate and present a synthetic authentication question. In contrast, it might take two seconds for the authentication server 302 to query the transactions database 303 and generate an authentication question based on a real transaction conducted by a legitimate account. As such, a nefarious actor might be able to time the presentation of questions to infer whether the questions reflect real data and/or are synthetic. A computing device may determine an average time to generate and provide legitimate questions for the account. In the example provided above, the time to generate and provide legitimate questions is two seconds. The synthetic authentication question may be configured such that a computing device provides, based on the average time, the synthetic authentication question. Returning to the example above, this might mean that a synthetic authentication question is provided after two seconds have elapsed, rather than as soon as it is ready (that is, in the example above, half a second). Additionally and/or alternatively, the synthetic authentication question might be configured to be presented within a range of time. For example, if it usually takes within two and five seconds to generate and provide legitimate questions for an account, synthetic authentication questions might be configured to be generated and provided between two and five seconds. To accomplish such speed, the complexity of algorithms with which synthetic authentication algorithms are generated might be modified. For example, if one algorithm takes too long to generate a synthetic authentication algorithm, a faster algorithm might be used instead, even if the faster algorithm might result in slightly less random (and/or slightly less believable) synthetic authentication questions.

Generating the synthetic authentication question may be based on determining that the request (e.g., the request received in step 501) was received from a malicious actor. A malicious actor might be any individual other than an authorized user of an account, and might be, for example, a hacker. A computing device may analyze one or more properties of the request for access to the account associated with the user (e.g., the request received in step 501). Those properties might include the manner in which the request was received (e.g., from a web browser, from a phone, via an IVR system), the time when the request was received (e.g., whether the request was received at a time when legitimate users are likely to be asleep), the location from which the request was received (e.g., from a local or foreign IP address), or the like. Based on those properties, the computing device may determine that the request was received from a malicious actor. Determining that the request was received from a malicious actor might be based on one or more rules set by an administrator. For example, one or more IP address ranges might be associated with a malicious actor, such that a request might be determined to be from a malicious actor if it originates from an IP address within that range. As another example, a request might be determined to be from a malicious actor if authentication requests have been received for the same username over five times in a thirty minute period.

Generating a synthetic authentication question might comprise identifying a real merchant. A computing device might query the organizations database 306 to determine a plurality of merchants which might be used to generate a synthetic transaction. By querying the organizations database 306 to determine one or more merchants that might be used as part of generating a synthetic transaction, the synthetic transaction might use a real merchant, rather than an invented merchant, thereby improving the believability of the synthetic transaction. Then, a synthetic authentication question might be generated based on the synthetic transaction, such that the synthetic authentication question might relate to a real merchant. Because the synthetic authentication question might thereby relate to a real-life merchant, the synthetic transaction might not be as easily identified by a malicious actor to be synthetic.

In step 510, the computing device may provide the synthetic authentication question to, e.g., a user device. Providing the authentication question may comprise causing display of the authentication question in a user interface, such as on a website. Providing the authentication question may additionally and/or alternatively comprise causing the authentication question to be presented in an audio form via, e.g., an IVR system.

In step 511, the computing device may receive a response to the synthetic authentication question. The response to the synthetic authentication question may be received from a user device, such as the user device 301. The answer might be a selection of a radio option, a written response in a text box, an oral response from a user of the user device 301, or the like. The response need not be in any particular format.

In step 512, the computing device may deny access to the account. Because the synthetic authentication question generated in step 509 is synthetic, no possible answer to the question could be correct. As such, the presentation of the synthetic authentication question is, as indicated above, intended to replicate, from the perspective of the user, the same process depicted in steps 504-506. In this way, steps 509-511 operate to avoid allowing a nefarious user to guess whether the candidate authentication credentials are correct, but do not provide the user access to the account.

As part of step 512, various protective steps might be taken by the system. For example, a log might be updated to reflect the request for access received in step 501. Such a log might include, for example, a time when the request was received, the candidate authentication credentials received, or the like. As part of performing this logging, additional information might be collected about the requesting user device (e.g., IP address, telephone number, GPS coordinates, or the like) so as to better log the origin of a potential attack. In this manner, invalid attempts to access the system might be monitored. Additionally and/or alternatively, network protective actions might be taken. For example, where the candidate authentication credentials attempt to access a particular account, that account might be locked for a particular period of time (e.g., thirty minutes) so as to protect the account from repeated log-in attempts (e.g., brute forcing). Additionally and/or alternatively, where the request in step 501 is received via an IVR system, the call might be routed to a human operator to perform additional, finer-detail authentication steps via voice communications.

Figure 6A:
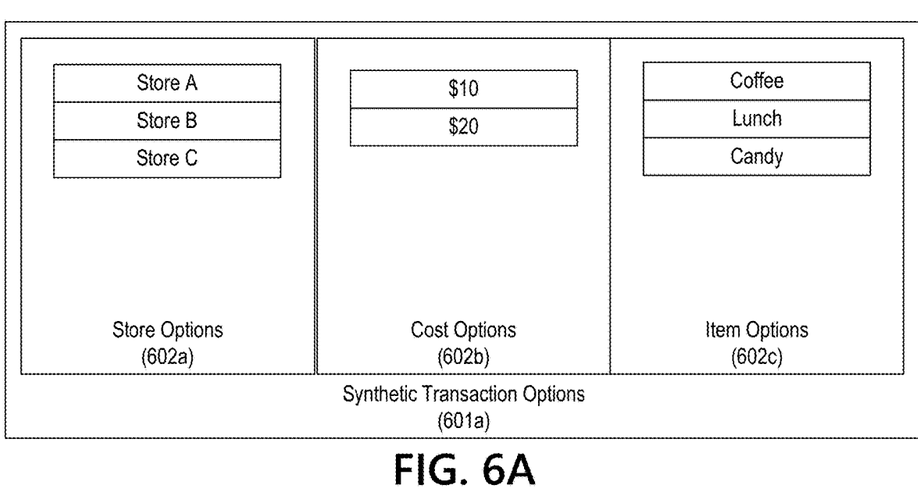
FIG. 6A depicts illustrative synthetic transaction options.

FIG. 6A depicts an illustrative set of synthetic transaction options 601*a*. The synthetic transaction options 601*a* include a plurality of store options 602*a*, a plurality of cost options 602*b*, and a plurality of item options 602*c*. These options are merely illustrative, and represent data which might be used by some algorithms to generate a synthetic transaction. For example, an algorithm (e.g., specified by data stored by the synthetic transactions database 305 and/or which might be executed by the authentication server 302) might randomly select from these options to generate a synthetic transaction. Though only select options are depicted in FIG. 6A, in practice, thousands (if not millions) of different options might be available, thereby increasing the likelihood that a generated synthetic transaction is random. Moreover, some of the options depicted in FIG. 6A might be real, and/or might reflect real transactions conducted by legitimate accounts. For example, data stored by the transactions database 303 might indicate that many different financial accounts have conducted transactions at Store A for $10. The plurality of store options 602*a* might be based on data stored by the organizations database 306. In this way, the plurality of store options 602*a* might comprise real-life stores.

Figure 6B:
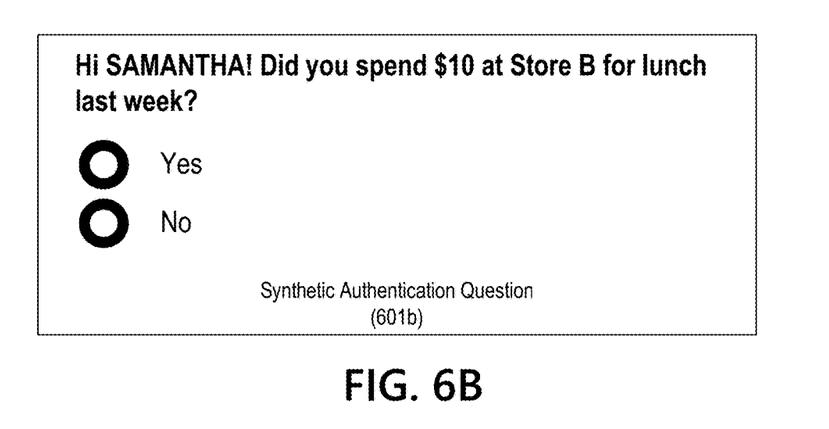
FIG. 6B depicts an illustrative synthetic authentication question.

FIG. 6B depicts an illustrative synthetic authentication question 601*b* that has been generated based on randomly-selected options of the synthetic transaction options 601*a* depicted in FIG. 6A. The synthetic authentication question 601*b* comprises a prompt 603 that asks a user ("Samantha") whether they spent $10 at Store B for lunch last week. In this manner, the synthetic authentication question 601*b* is configured to appear as if a real transaction may have occurred, even though the question is premised on a synthetic transaction that was generated based on the random selection of various options.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving, by a computing device, a request for access to an account associated with a user, wherein the request for access comprises candidate authentication information associated with the account;
    querying an account database for account data corresponding to the account; and
    in response to determining, based on comparing the candidate authentication information with the account data, that a first portion of the candidate authentication information comprises a valid user identifier for the account and that a second portion of the candidate authentication information does not correspond to the account:
        generating a synthetic transaction by:
            processing the account data to determine a plurality of merchants; and
            identifying a first merchant not included in the plurality of merchants,
        wherein the synthetic transaction comprises a synthetic financial transaction conducted at the first merchant;
        generating, based on the synthetic transaction, a synthetic authentication question, wherein the synthetic authentication question indicates that the second portion of the candidate authentication information is valid; and
        authenticating the request for access to the account by determining whether a received answer to the synthetic authentication question is correct.

2. The method of claim 1, wherein the generating the synthetic authentication question comprises:
    providing, as input to a trained machine learning model, the candidate authentication information and the synthetic transaction, wherein the trained machine learning model is trained based on a plurality of accounts; and
    receiving, as output from the trained machine learning model and based on the input, a synthetic account, wherein the generating the synthetic authentication question is based on the synthetic account.

3. The method of claim 1, wherein the generating the synthetic transaction comprises:
    querying, based on the account data, the account database for one or more second accounts similar to the account; and
    determining second account data corresponding to the one or more second accounts, wherein the generating the synthetic transaction is further based on the second account data.

4. The method of claim 1, wherein the generating the synthetic authentication question comprises:
    generating the synthetic authentication question using a same algorithm as used to generate legitimate authentication questions.

5. The method of claim 1, wherein the generating the synthetic authentication question is further based on the candidate authentication information.

6. The method of claim 1, wherein the generating the synthetic transaction comprises:
    determining a pattern of transactions conducted by the account, wherein generating the synthetic transaction is based on the pattern of transactions.

7. The method of claim 1, further comprising:
    determining an origin of the request for access to the account associated with the user, wherein the generating the synthetic authentication question is further based on the origin.

8. The method of claim 1, further comprising:
    determining an average time to generate and provide legitimate questions for the account; and
    providing, based on the average time, the synthetic authentication question.

9. The method of claim 1, wherein the generating the synthetic authentication question is based on determining, based on one or more properties of the request for access to the account associated with the user, that the request was received from a malicious actor.

10. A computing device comprising:
one or more processors; and
memory storing instructions that, when executed by the one or more processors, cause the computing device to:
receive a request for access to an account associated with a user, wherein the request for access comprises candidate authentication information associated with the account;
query an account database for account data corresponding to the account; and
in response to determining, based on comparing the candidate authentication information with the account data, that a first portion of the candidate authentication information comprises a valid user identifier for the account and that a second portion of the candidate authentication information does not correspond to the account:
generate, based a first transaction indicated by the account data, a synthetic transaction by:
processing the account data to determine a plurality of merchants; and
identifying a first merchant not included in the plurality of merchants, wherein the synthetic transaction comprises a synthetic financial transaction conducted at the first merchant;
generate, based on the synthetic transaction, a synthetic authentication question, wherein the synthetic authentication question indicates that the second portion of the candidate authentication information is valid; and
authenticate the request for access to the account by determining whether a received answer to the synthetic authentication question is correct.

11. The computing device of claim 10, wherein the instructions, when executed by the one or more processors, cause the computing device to generate the synthetic authentication question by causing the computing device to:
provide, as input to a trained machine learning model, the candidate authentication information and the synthetic transaction, wherein the trained machine learning model is trained based on a plurality of accounts; and
receive, as output from the trained machine learning model and based on the input, a synthetic account, wherein generating the synthetic authentication question is based on the synthetic account.

12. The computing device of claim 10, wherein the instructions, when executed by the one or more processors, cause the computing device to generate the synthetic transaction by causing the computing device to:
query, based on the account data, the account database for one or more second accounts similar to the account; and
determine second account data corresponding to the one or more second accounts, wherein the instructions, when executed by the one or more processors, cause the computing device to generate the synthetic transaction further based on the second account data.

13. The computing device of claim 10, wherein the instructions, when executed by the one or more processors, cause the computing device to generate the synthetic authentication question by causing the computing device to:
generate the synthetic authentication question using a same algorithm as used to generate legitimate authentication questions.

14. The computing device of claim 10, wherein the instructions, when executed by the one or more processors, cause the computing device to generate the synthetic authentication question further based on the candidate authentication information.

15. The computing device of claim 10, wherein the instructions, when executed by the one or more processors, cause the computing device to generate the synthetic transaction by causing the computing device to:
determine a pattern of transactions conducted by the account, wherein the instructions, when executed by the one or more processors, cause the computing device to generate the synthetic transaction further based on the pattern of transactions.

16. One or more non-transitory computer-readable media storing instructions that, when executed by one or more processors, cause a computing device to:
receive a request for access to an account associated with a user, wherein the request for access comprises candidate authentication information associated with the account;
query an account database for account data corresponding to the account; and
in response to determining, based on comparing the candidate authentication information with the account data, that a first portion of the candidate authentication information comprises a valid user identifier for the account and that a second portion of the candidate authentication information does not correspond to the account:
generate, based a first transaction indicated by the account data, a synthetic transaction by:
processing the account data to determine a plurality of merchants; and
identifying a first merchant not included in the plurality of merchants,
wherein the synthetic transaction comprises a synthetic financial transaction conducted at the first merchant;
generate, based on the synthetic transaction, a synthetic authentication question, wherein the synthetic authentication question indicates that the second portion of the candidate authentication information is valid; and
authenticate the request for access to the account by determining whether a received answer to the synthetic authentication question is correct.

17. The computer-readable media of claim 16, wherein the instructions, when executed by the one or more processors, cause the computing device to generate the synthetic authentication question by causing the computing device to:
provide, as input to a trained machine learning model, the candidate authentication information and the synthetic transaction, wherein the trained machine learning model is trained based on a plurality of accounts; and
receive, as output from the trained machine learning model and based on the input, a synthetic account, wherein generating the synthetic authentication question is based on the synthetic account.

18. The computer-readable media of claim 16, wherein the instructions, when executed by the one or more processors, cause the computing device to generate the synthetic transaction by causing the computing device to:
query, based on the account data, the account database for one or more second accounts similar to the account; and
determine second account data corresponding to the one or more second accounts, wherein the instructions, when executed by the one or more processors, cause the computing device to generate the synthetic transaction further based on the second account data.

19. The computer-readable media of claim 16, wherein the instructions, when executed by the one or more processors, cause the computing device to generate the synthetic authentication question by causing the computing device to:
generate the synthetic authentication question using a same algorithm as used to generate legitimate authentication questions.

20. The computer-readable media of claim 16, wherein the instructions, when executed by the one or more processors, cause the computing device to generate the synthetic authentication question further based on the candidate authentication information.

* * * * *